United States Patent [19]

Lening

[11] 3,972,639
[45] Aug. 3, 1976

[54] PIPE COUPLING
[76] Inventor: George O. Lening, 1867 S. Valencia, Rowland Heights, Calif. 91745
[22] Filed: July 17, 1975
[21] Appl. No.: 596,629

[52] U.S. Cl. .............................. 403/191; 256/59; 403/235
[51] Int. Cl.² .......................................... F16B 7/08
[58] Field of Search ............... 256/59, 60, 65, 68, 256/73; 403/241, 242, 274, 284, 233, 234, 235, 237, 191, 192

[56] References Cited
UNITED STATES PATENTS

| | | | |
|---|---|---|---|
| 340,263 | 4/1886 | Weber | 256/68 |
| 2,846,249 | 8/1958 | Johnson | 403/242 |
| 3,522,960 | 8/1970 | Moore | 403/292 |

Primary Examiner—Werner H. Schroeder
Assistant Examiner—Doris L. Troutman
Attorney, Agent, or Firm—Boniard I. Brown

[57] ABSTRACT

A pipe coupling, such as a top rail cap for a chain link fence, is fabricated by positioning in one end of a sleeve, in a plane parallel to the sleeve axis, a ring which seats against diametrically opposed portions of the sleeve end with a minor portion of the ring protruding into the sleeve, and deforming inwardly toward one another, into overlapping conformal seating engagement with the minor ring portion, the diametrically opposed sleeve end portions which span the open sides of the ring, thus to firmly secure the ring to the sleeve with the ring exposed beyond the end of the sleeve. The sleeve is secured over an end of a first pipe and the ring receives a second transverse pipe for joining the pipes to one another. The ring may be a solid ring of fixed diameter or a split ring which may be contracted into clamping engagement with its received pipe.

18 Claims, 12 Drawing Figures

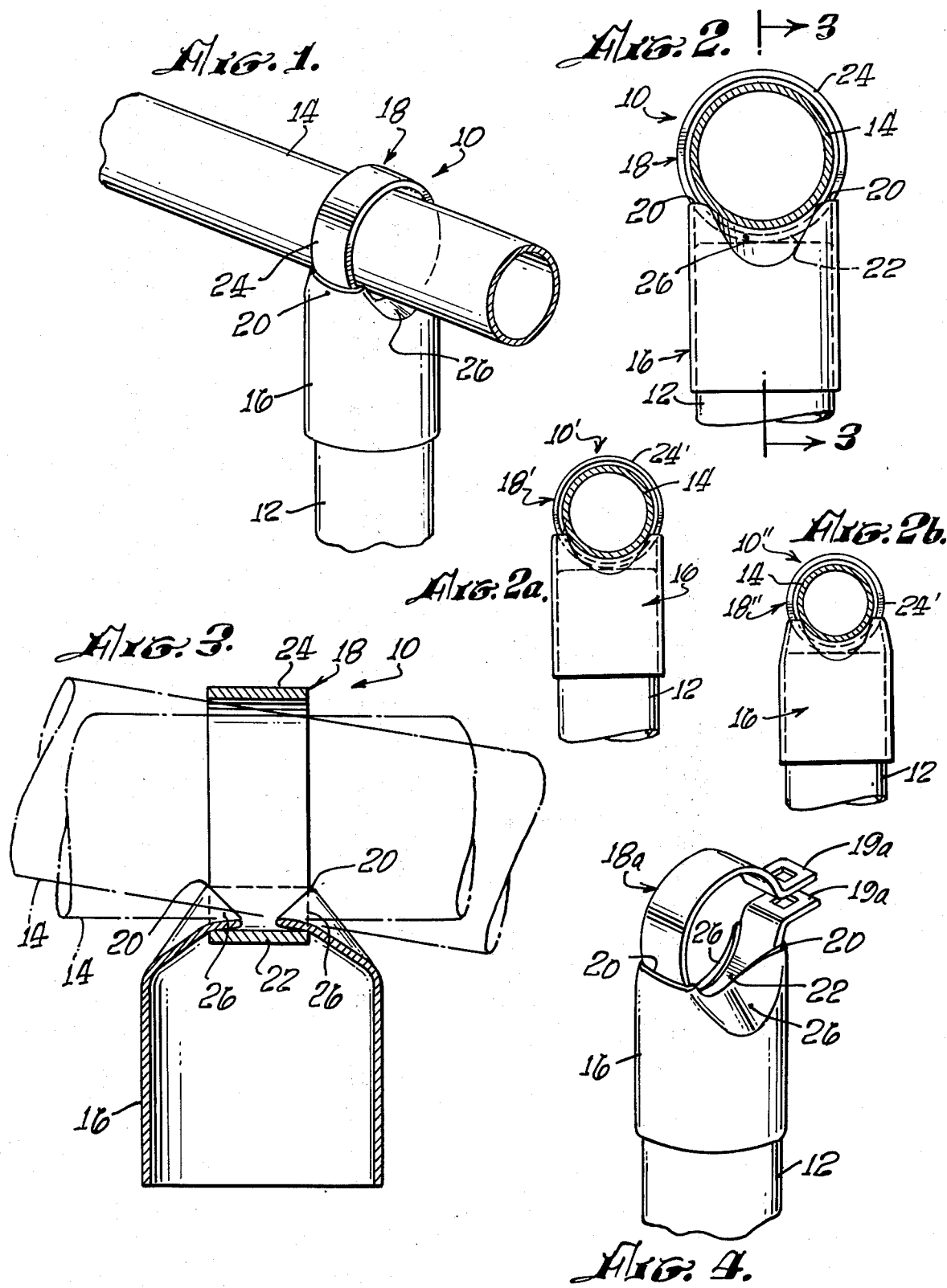

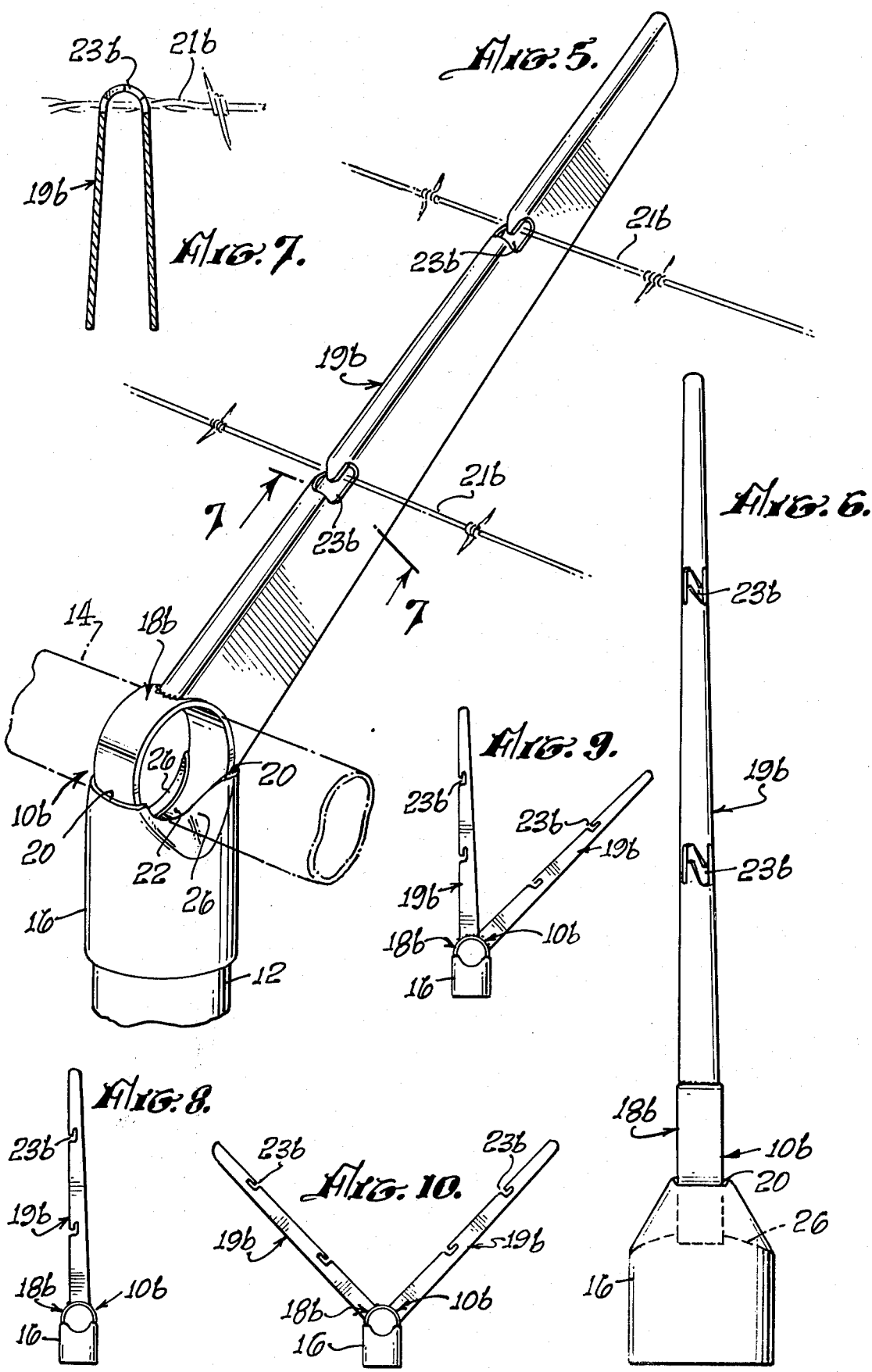

PIPE COUPLING

BACKGROUND OF THE INVENTION

1. Field of the Invention

This invention relates generally to pipe couplings and more particularly to such a coupling for joining a first pipe to one end of a second transverse pipe; The invention relates also to a method of fabricating the coupling.

2. Discussion of the Prior Art

As will appear from the ensuing description, the pipe coupling of the invention may be utilized for a variety of coupling applications. In its broader aspects, therefore, the invention provides an essentially general purpose pipe coupling. The preferred form of the invention is designed for securing the top pipe rails of a chain link fence to the upper ends of the fence pipe posts.

The construction of a chain link fence involves initial setting of a number of vertical fence posts, in the form of metal pipes, in the ground in spaced relation along the route of the fence with each post embedded in a concrete footing or the like. The upper ends of the adjacent posts are then joined by top rails, comprising metal pipes, which span the regions between and are secured to the upper ends of the posts. These top rails are secured to the posts by pipe couplings which are referred to in the fence industry as rail caps, eyetops, and various other names. The term rail cap is used in this disclosure. Finally, the chain link fencing is applied to complete the fence.

A wide variety of rail caps have been devised. Simply stated, such a cap comprises a sleeve-like part open at one end to form a socket for receiving the upper end of a fence post, and a transverse opening at the upper end of the part, whose axis is normally generally horizontal when the cap is installed, for receiving a top rail. The existing rail caps have various configurations and are fabricated in a number of different ways. For example, some caps are injection molded, forged or otherwise formed in one piece from aluminum or other suitable material. Other caps are fabricated in separate parts which are welded or otherwise joined. Examples of existing rail caps are found in U.S. Pat. Nos. 643,591; 1,765,651; 2,846,241; and 3,776,523.

While the existing rail caps are satisfactory to some degree, they have certain deficiencies which this invention overcomes. The foremost of these are relatively high cost of manufacture, and structural weakness which often results in cracking or damage to the caps, particularly during installation due to excessive torques and other loads inadvertently applied to the caps through the long lever arm of a top rail during its insertion through the cap. Some existing rail caps also provide very little supporting surface contact area with the top rail. Accordingly, the force per unit area is extremely high and, as a result, even the slightest abnormal twist or other load applied to the cap through a top rail may damage the cap.

As noted earlier, while the preferred embodiment of the invention is a chain link fence rail cap, the invention in its broader aspects provides a pipe coupling of general usage.

BRIEF DESCRIPTION OF THE DRAWINGS

FIG. 1 is a perspective view of a chain link rail cap according to the invention;

FIG. 2 is a side elevation of the cap;

FIGS. 2a and 2b are side elevational views, similar to that of FIG. 2, showing modified rail caps of the invention wherein ring elements of differing sizes are utilized;

FIG. 3 is an enlarged section taken on line 3—3 in FIG. 2;

FIG. 4 is a perspective view of a modified rail cap utilizing a split ring element;

FIG. 5 is a perspective view of a modified rail cap for use on a chain link fence topped with barb wire;

FIG. 6 is a top view of the rail cap in FIG. 5;

FIG. 7 is a section taken on line 7—7 in FIG. 5; and

FIGS. 8–10 illustrate modified rail caps for a barb wire topped fence.

DESCRIPTION OF THE PREFERRED EMBODIMENT

Referring first to FIGS. 1–3, of these drawings, there is illustrated a pipe coupling 10 according to the invention which, in this instance, is a rail cap for joining a post 12 and a top rail 14 of a chain link fence. The post and top rail are metal pipes which are generally galvanized or otherwise treated. The pipe coupling or rail cap comprises a sleeve 16 providing a socket which opens through one end of the sleeve for receiving the pipe or post 12. The sleeve may simply slide over the post or it may be frictionally or otherwise secured to the post. Fixed to the opposite or upper end of the sleeve 16 is a ring 18 disposed in a plane parallel to the sleeve axis for receiving therethrough the top rail 14. Both the sleeve and ring are fabricated from a suitable material which, in the case of the illustrated chain link fence rail cap, is steel.

As shown best in FIG. 2, the ring 18 may have a greater outside diameter than the inner diameter of the sleeve 16. The ring is positioned in the sleeve end with the outside of the ring seating against diametrically opposed portions 20 of the sleeve. A minor portion 22 of the ring protrudes into the sleeve. A major portion 24 of the ring projects beyond the sleeve end.

The diametrically opposed portions 26 of the sleeve 16 which span the open sides of the ring 18 between the sleeve portions so are deformed inwardly, such they converge into overlapping seating engagement with the minor ring portion, as best shown in FIG. 3. These deformed sleeve portions 26 press firmly against the minor ring portion to firmly secure the ring 18 to the sleeve 16. Sleeve portions 26 are deformed into conforming relation with the inner concave surface of the minor ring portion, such that the exposed surfaces of these are cylindrically concave surfaces concentric with the ring for seating the top rail pipe 14.

The rail cap 10 is fabricated by positioning the ring 18 in the end of the sleeve 16 and then deforming the sleeve portions 26 inwardly over the ring. This deforming step may be performed by driving tapered cylindrical forming members inwardly toward one another through the ring 18 and against the sleeve portions 26 to bend the latter inwardly and then driving the members laterally against the bent sleeve portions to deform the latter into conforming relation with the ring.

The ring 18 of rail cap 10 is a solid ring without a break about its full circumference. In this regard, an advantage of the invention is that twisting of the top rail 14 in the manner shown in FIG. 3, during installation of a fence, for example, is easily sustained by the rail cap without any damage, aside from perhaps distorting the ring. In existing rail caps, such twisting often cracks a cast rail cap or fractures the welds of a two piece welded cap.

The modified rail caps 10' of FIG. 2a and 10" of FIG. 2b are similar to that of FIGS. 1 to 3 except that cap ring 18' has the same diameter as, and cap ring 18" has a smaller diameter than, the inner diameter of the sleeve 16 instead of being larger in diameter than the sleeve 16, as is sleeve 10 of FIG. 2.

The modified rail cap 10a of FIG. 4 is like that of FIGS. 1–3 except that the cap ring 18a is split and the split ends are bent and aperatured to provide tongues 19a through which a bolt and nut may be inserted for clamping the ring firmly about the top rail 14.

Turning to FIGS. 5–7, the illustrated rail cap 10b has a sheet metal arm 19b of channel section welded to and extending radially from the cap ring 18b at an upward sloping angle for supporting both wires 21b. The arm 19b has slots 23b with the unique labrynth-like or z-shape shown best in FIG. 6 for receiving and captivating the barb wire strands. This type of rail cap is utilized in a barb wire topped chain link fence. FIGS. 8–10 illustrate other rail caps for such fences, wherein the barb wire support arms are disposed at various angles. The caps in FIGS. 9 and 10 have two arms each to provide a trough-like barb wire structure or barrier along the top of a chain link fence.

The inventor claims:

1. A pipe coupling for joining two pipes in transverse relation to one another, comprising
    a sleeve providing a socket opening through one end of the sleeve for receiving an end of one pipe,
    a ring positioned within the other end of said sleeve with the plane of the ring parallel to the longitudinal axis of the sleeve and with the outer side of the ring seating against first diametrically opposite portions of said other sleeve end, whereby a minor portion of the ring protrudes into the latter sleeve end, a major portion of the ring projects beyond the latter sleeve end, and the latter sleeve end has second diametrically opposed portions spanning the open sides of said ring between said first diametrically opposed sleeve portions, and
    said second sleeve portions converging inwardly toward one another into overlapping seating contact with the inner side of said minor ring portion to firmly secure said ring to said sleeve with the ring exposed to receive the other pipe.

2. A pipe coupling according to claim 1 wherein said ring has an outer diameter greater than the inner diameter of said sleeve.

3. A pipe coupling according to claim 1 wherein:
said ring has an outer diameter smaller than the inner diameter of said sleeve.

4. A pipe coupling according to claim 1 wherein:
said ring has an outer diameter equal to the inner diameter of said sleeve.

5. A pipe coupling according to claim 1 wherein:
said second diametrically opposed sleeve portions conform generally to the inner curvature of said ring, whereby said latter sleeve portions have exposed cylindrically concave surfaces substantially coaxial with said ring for seating the pipe received by the ring.

6. A pipe coupling according to claim 5 wherein:
said ring is a solid ring continuous without a break about the full ring circumference.

7. A pipe coupling according to claim 5 wherein:
said ring is resiliently flexible and has a split in said major portion thereof, and
means for releasibly clamping said ring about the pipe received by the ring.

8. A pipe coupling according to claim 5 wherein:
said coupling is a rail cap for a chain link fence.

9. In combination:
a first pipe,
a second pipe at one end of and transverse to said first pipe, and
a pipe coupling joining said pipes comprising
    a sleeve providing a socket opening through one end of the sleeve and receiving said end of said first pipe,
    a ring receiving said second pipe and being positioned within the other end of said sleeve with the plane of the ring parallel to the longitudinal axis of the sleeve and with the outer side of the ring seating against first diametrically opposite portions of said other sleeve end, whereby a minor portion of the ring protrudes into the latter sleeve end, a major portion of the ring projects beyond the latter sleeve end, and the latter sleeve end has second diametrically opposed portions spanning the open sides of said ring between said first diametrically opposed sleeve portions, and
    said second sleeve portions converging inwardly toward one another into overlapping seating contact with the inner side of said minor ring portion to firmly secure said ring to said sleeve with the ring exposed to receive said second pipe.

10. The combination according to claim 9 wherein:
said ring has an outer diameter greater than the inner diameter of said sleeve.

11. The combination according to claim 9 wherein:
said ring has an outer diameter smaller than the inner diameter of said sleeve.

12. The combination according to claim 9 wherein:
said ring has an outer diameter equal to the inner diameter of said sleeve.

13. The combination according to claim 9 wherein:
said second diametrically opposed sleeve portions conform generally to the inner curvature of said ring, whereby said latter sleeve portions have exposed cylindrically concave surfaces substantially coaxially with said ring for seating the pipe received by the ring.

14. The combination according to claim 13 wherein:
said ring is a solid ring continuous without a break about the full ring circumference.

15. The combination according to claim 13 wherein:
said ring is resiliently flexible and has a split in said major portion thereof, and
means for releasibly clamping said ring about the pipe received by the ring.

16. The combination according to claim 13 wherein:
said first pipe is a post for a chain link fence,
said second pipe is a top rail of the fence, and
said pipe coupling is a rail cap of the fence joining said top rail to the upper end of said post.

17. The combination according to claim 16 including:
a support arm rigidly joined at one end to said major ring portion and extending radially out from said ring in the plane of the ring for supporting strands of barb wire.

18. The combination according to claim 17 wherein:
said arm has labrynth cut-outs spaced along the arm for receiving said wire strands.

* * * * *